(12) United States Patent
Payton et al.

(10) Patent No.: US 7,113,746 B2
(45) Date of Patent: Sep. 26, 2006

(54) METHOD AND APPARATUS FOR SIGNALING AMONG A PLURALITY OF AGENTS

(75) Inventors: David W. Payton, Woodland Hills, CA (US); Bruce Hoff, Venice, CA (US); Mike Howard, Westlake Village, CA (US); Craig Lee, Redondo Beach, CA (US)

(73) Assignee: HRL Laboratories, LLC, Malibu, CA (US)

( * ) Notice: Subject to any disclaimer, the term of this patent is extended or adjusted under 35 U.S.C. 154(b) by 977 days.

(21) Appl. No.: 09/921,295

(22) Filed: Aug. 2, 2001

(65) Prior Publication Data
US 2002/0094780 A1 Jul. 18, 2002

Related U.S. Application Data

(60) Provisional application No. 60/222,165, filed on Aug. 1, 2000.

(51) Int. Cl.
*H04B 7/00* (2006.01)
*H04B 7/08* (2006.01)
*H04B 17/02* (2006.01)

(52) U.S. Cl. .............. 455/41.2; 455/132; 455/133; 455/134

(58) Field of Classification Search ........... 379/201.06, 379/201.07, 201.08, 201.09, 201.1, 207.12; 455/39, 41.2, 69, 132, 133, 134
See application file for complete search history.

(56) References Cited

U.S. PATENT DOCUMENTS

| | | | |
|---|---|---|---|
| 4,028,533 A | 6/1977 | Matsubara | |
| 4,710,944 A | * | 12/1987 | Nossen ............... 375/267 |
| 4,999,833 A | 3/1991 | Lee | |
| 5,233,604 A | 8/1993 | Ahmadi et al. | |

(Continued)

FOREIGN PATENT DOCUMENTS

EP 0564160 10/1993

(Continued)

OTHER PUBLICATIONS

D. W. Gage, "Command and Control for Many-Robot Systems", In the Nineteenth Annual AUVS Technical Symposium (AUVS-91), Huntsville, AL, Jun. 22-24, 1992. Reprinted in Unmanned Systems Magazine, 10(4):28-34, Fall 1992.

(Continued)

*Primary Examiner*—Bing Q. Bui
(74) *Attorney, Agent, or Firm*—Tope-McKay & Associates

(57) ABSTRACT

A method, an apparatus, and a computer program product for facilitating local signaling among a plurality of agents are presented. An agent 100 including a digital processor 102 a transmitter 104, and a directional receiver 106 comprising a plurality of angular regions 108 is configured to enable the selection of a signal from a plurality of signals received on the basis of local data such as the strength of the received signal. The local data may be incorporated into a cumulative data portion of a signal that is passed from local agent 100 to local agent 100 across a plurality of agents 100 in order to provide a gradient across the plurality of agents 100. The gradient could be used, for example, to determine a shortest path across the agents. The signaling techniques described can also be used to determine the distance and direction to objects in the signaling path.

99 Claims, 12 Drawing Sheets

U.S. PATENT DOCUMENTS

| | | | |
|---|---|---|---|
| 5,390,166 A * | 2/1995 | Rohani et al. | 370/335 |
| 5,561,790 A | 10/1996 | Fusaro | |
| 5,675,741 A | 10/1997 | Aggarwal et al. | |
| 5,687,196 A | 11/1997 | Proctor, Jr. et al. | |
| 5,946,083 A | 8/1999 | Melendez et al. | |
| 5,991,300 A | 11/1999 | Tappan | |
| 6,154,139 A | 11/2000 | Heller | |
| 6,195,020 B1 | 2/2001 | Brodeur, Sr. et al. | |
| 6,208,247 B1 | 3/2001 | Agre et al. | |
| 6,311,129 B1 | 10/2001 | Lin | |
| 6,490,350 B1 * | 12/2002 | McDuff et al. | 379/265.06 |
| 6,700,538 B1 * | 3/2004 | Richards | 342/458 |

FOREIGN PATENT DOCUMENTS

| | | |
|---|---|---|
| WO | 9507587 | 3/1995 |
| WO | 9946899 | 9/1999 |

OTHER PUBLICATIONS

D. W. Gage, "Many Robot Systems", SPAWAR web page, http://www.nosc.mil.robots/research/manyrobo/manyrobo.html.

* cited by examiner

| Type | Direction | Signal Intensity (cumulative data) | Timestamp | Strength (local data) | Other Data |
|------|-----------|-----------------------------------|-----------|----------------------|------------|
| 10 | 1 | 11 | | 26 | |
| 10 | 1 | 22 | | 24 | |
| 10 | 7 | 34 | | 25 | |
| 22 | 0 | 16 | | 43 | |
| 22 | 1 | 66 | | 21 | |
| 22 | 5 | 34 | | 45 | |
| 36 | 4 | 43 | | 44 | |
| 36 | 5 | 12 | | 46 | |
| 65 | 2 | 48 | | 19 | |
| 65 | 6 | 46 | | 13 | |

Valid Messages Memory

FIG. 8

Selected Messages Memory

| Pheromone Type Code | Direction Key | Signal Intensity | Message Timestamp | Strength | Data |
|---|---|---|---|---|---|
| 10 | 1 | 22 | | 24 | |
| 10 | 7 | 34 | | 25 | |
| 22 | 1 | 66 | | 21 | |
| 22 | 5 | 34 | | 45 | |
| 36 | 4 | 43 | | 44 | |
| 65 | 2 | 48 | | 19 | |
| 65 | 6 | 46 | | 13 | |

FIG. 10

METHOD AND APPARATUS FOR SIGNALING AMONG A PLURALITY OF AGENTS

PRIORITY CLAIM

This application claims the benefit of priority to provisional applications No. 60/222,165, filed in the United States on Aug. 1, 2000, and titled "Virtual Phermone Messaging System".

STATEMENT OF GOVERNMENT RIGHTS

This invention is related to work performed in contract with the U.S. Government under DARPA ITO Contract #N66001-99-C-8514, "Pheromone Robotics", and the U.S. Government may have certain rights in this invention.

BACKGROUND (1) Technical Field

The present invention is related to the field of data signaling. More specifically, this disclosure presents a method and apparatus for local signaling among a plurality of agents in order to assist in coordination and messaging therebetween.

(2) Brief Discussion of the Prior Art

Over the past several decades, the electronic communications field, particularly in the area of wireless communication, has exploded. In addition, the abilities of small processing devices have increased considerably while the cost of these devices has decreased. Wireless communication generally takes place between specific devices or nodes. In order to perform tasks such as developing routes through a network, it is necessary to provide each member of a network with a unique identification so that specific devices may communicate. For example, in a cellular network or even in an adhoc network, a unique identification or address is assigned to each device so that it may exclusively receive calls targeted to its address. In addition, communications in most networks also require a "handshake" or mutual acknowledgement that a call, or communication, is to be set up. These networks depend on physical reliability in order function properly. Various communication properties are used in monitoring the performance of individual links in the network in order to adjust parameters of the communication system in order to maximize its effectiveness.

With the increased computational abilities and reduced cost of small, relatively simple devices comes the need for additional communication schemes. In particular, it is desirable to take advantage of the processing capability of modem devices while conserving power by using local communications.

SUMMARY OF THE INVENTION

The disclosed invention presents an agent for receiving signals from at least one other locally spaced agent. The agent comprises at least one signal receiver for receiving a strength signal having a signal strength from at least one other locally spaced agent; at least one data receiver for receiving a data signal including data from at least one other locally spaced agent; means for associating each data signal with a strength signal, where the data signal and the strength signal associated are from the same other locally spaced agent; and means for selecting a data signal based on its associated strength signal.

The signal receiver and data receiver may be directional receivers, and the selection of the data signal may be based on its associated strength and an associated signal direction. The directional receivers may be designed to divide the space from which they receive signals into angular regions, which may be selectively combined to allow for varying patterns or varying angular accuracy in the determination of the direction from which a digital signal was received.

An agent may also include the ability to approximate the distance to another agent from which it has received a signal based on the signal strength of the strength signal.

Additionally, and preferably, the signal receiver and the data receiver are incorporated as a single receiver, and the strength signal and the data signal are combined into a message signal including a signal strength and data. Furthermore, agent is preferably configured for receiving the message signal in the form of a digital data packet having a data portion with at least one data element.

The agent preferably also comprises a digital processor connected with the receiver for receiving the digital data packet; an analog to digital converter connected with the receiver and with the digital processor for digitizing the signal strength and for providing the digitized signal strength to the digital processor; and a memory connected with the processor for storing digital data packets.

It is further desirable that an agent incorporates a means for time stamping received digital data packets and for storing the time stamped received digital data packets in memory along with the digital data packets. Incorporating the a time stamp allows an agent to eliminate digital data packets from memory when they have reached a predetermined age. Furthermore, signals may be selected based on factors from a group consisting of the digital data packet, the signal strength, and the time stamp.

In order to ensure that digital data packets are received correctly, it is preferred that an agent incorporates a means for checking the validity of received digital data packets, wherein digital data packets found invalid are removed from memory.

Furthermore, it is preferred that the agents be configured for receiving message signals of different types, and wherein the means for selecting is operated independently for signals of each type.

It is also desirable that an agent be configured to receive message signals including at least one cumulative data portion. The cumulative data portion provides a mechanism by which agents may keep a cumulative record of sorts as a message is passed among the plurality of agents.

The agents may also include a means for generating local data such as a sensor for determining local environmental characteristics, and may use the local data generated to modify the cumulative data portion of the message from the signal. In this case, the means for selecting a signal may utilize the cumulative data portion in the selection process. It is preferable that at least a portion of the cumulative data portion of the digital packets use the signal strength from the strength signal to accumulate a cumulative strength measure.

Additionally, and preferably, the agent further comprises a transmitter connected with the processor for transmitting a digital signal including a digital packet to at least one other locally spaced agent.

It is also desirable that the agent comprise a means for detecting when a signal just transmitted by the transmitter is received back in the receiver in order to detect reflection from objects near the agent and a means for determining the signal strength of the signal and for using the signal strength to approximate the distance of an object from the agent.

The transmitters and receivers are preferably selected from a group consisting of optical receivers, acoustic receivers, and radio frequency receivers. More preferably, however, both the transmitters and receivers operate in the infrared region.

As with the receivers, the transmitters may be directional transmitters and may transmit in combinable angular regions.

Preferably, the transmitters are configured to transmit a signal including a data packet including the modified cumulative data portion of the selected signal.

The transmitters may also be configured to vary the strength of transmission. This allows the agents to adjust to varying levels of congestion and to minimize signal collisions. Receiving agents may be provided with data regarding the strength of a transmission in order to accurately determine the distance from which a signal is received, and the signal strength used in selecting a signal may be an adjusted signal strength which takes into account the variation in the transmission strength of a signal.

The disclosed invention also includes the method by which the agents communicate. Generally, the method comprises the steps of receiving, at an agent from another locally spaced agent, at least one strength signal having a signal strength; receiving, at an agent from another locally spaced agent, at least one data signal including data; associating each data signal with a strength signal, where the data signal and the strength signal associated are from the same other locally spaced agent; and selecting a data signal based on its associated strength signal.

In the receiving steps, strength signals and data signals may be received from a direction, and the direction from which a signal was received may be factored into the selection step. The signals may be received from angular regions, and a step of selectively combining the angular regions may also be provided.

The method may also comprise a further step of approximating a distance from which a strength signal has traveled based on the signal strength of the strength signal.

The strength signal and the data signal may be received in the same receiving step and as a single message signal. Furthermore, the message signal may be received in the form of a digital packet having a data portion with at least one element. The signal strength of the message signal may be digitized for receipt by a digital processor, and may be stored in a memory.

The method may further comprise the step of time stamping the received digital packets and storing the time stamps along with the respective received digital packets. The selection step may also use elements selected from a group consisting of the digital data packet, the signal strength, and the time stamp in the selection of a message signal.

The method may further comprise a step of checking the validity of received digital packets and a step of removing digital packets found invalid from memory.

In the receiving step, message signals of different types may be received, and the selecting step may be operated independently for signals of each type.

In the receiving step, messages including at least one cumulative data portion may be received, and the method may further comprise a step of modifying at least one cumulative data portion of the digital packets. The method may further comprise a step of generating local data and the modifying step may use the local data for modifying the cumulative data portion. The selecting step may also use the cumulative data portion as a factor in selecting a message signal. In the receiving step, the, the cumulative data portion of the signal received may include a cumulative strength measure, and in the modifying step, the signal strength of the received signal may be used to modify the cumulative strength measure of the cumulative data portion.

The method preferably further comprises the step of transmitting a digital signal, including a digital packet, from the agent to at least one other locally spaced agent.

In order to provide for object detection, the method may further comprise a step of detecting when the same signal just transmitted by the transmitter is received back in the receiver in order to detect reflection from objects near the agent, and a step of determining the approximate distance from an object based on the strength of the signal received.

In the receiving step and in the transmitting step, the signals received and transmitted, respectively, are preferably from the group consisting of optical signals, acoustic signals, and radio frequency signals. Most preferably, the signals are infrared signals.

Additionally, signals may be transmitted in a direction such as in an angular region and in an additional step, angular regions may be selectively combined to allow for different angular accuracy in the determination of the direction to which a digital signal is transmitted.

In the transmitting step, the signal transmitted may include a data packet including the modified cumulative data portion of the selected signal.

Furthermore, the method may comprise a step of optionally varying the transmission strength. In the transmission step, the data packet transmitted may include information regarding the transmission strength of the transmitted signals, and the selecting step may further comprise a sub-step of using received information regarding the transmission strength to account for the altered strength of a signal when selecting from among signals.

The operations of the present invention may also be embodied in a computer program product stored on a computer writable medium such as an optical storage device such as a compact disc (CD) or digital versatile disc (DVD), or a magnetic storage device such as a floppy disk or magnetic tape.

BRIEF DESCRIPTION OF THE DRAWINGS

These and other features, aspects, and advantages of the present invention will become better understood with regard to the following description, appended claims, and accompanying drawings where:

FIG. 8 is a table used to provide a narrative description to give a better understanding of the steps involved in validating incoming signals;

FIG. 10 is a table used to provide a narrative description to give a better understanding of the steps involved in selecting messages from the validated messages memory for storage in the selected messages memory and of grouping directional bins;

DETAILED DESCRIPTION

Figure 1:
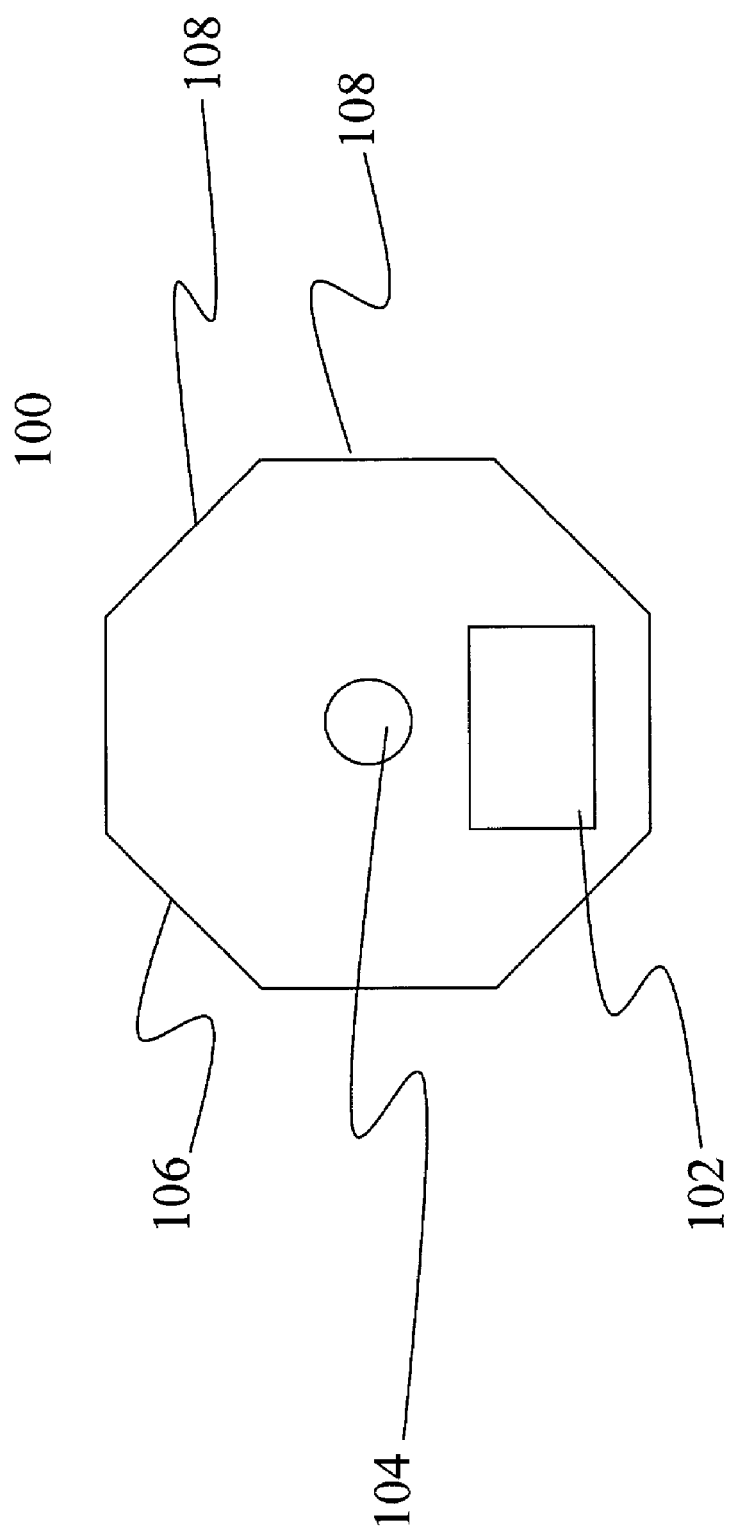
FIG. 1 is a perspective view of a directional signaling mechanism used in conjunction with the present invention.

The present invention relates to the field of field of data signaling. More specifically, this disclosure presents a method and apparatus for local signaling among a plurality of agents in order to assist in coordination and messaging therebetween. The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of embodiments. Thus, the present invention is not intended to be limited to the embodiments presented, but is to be accorded the widest scope consistent with the principles and novel features disclosed herein.

In order to provide a working frame of reference, first a glossary of terms used in the description and claims is given as a central resource for the reader. Then, a brief introduction is provided in the form of a narrative description of the present invention to give a conceptual understanding prior to developing the specific details.

Glossary

Before describing the specific details of the present invention, it is useful to provide a centralized location in which various terms used herein and in the claims. The terms defined are as follows:

Agent—As utilized herein, the term agent indicates a unit comprising, in its most general sense, at least one signal receiver and at least one data receiver, wherein the signal receiver is used to receive a signal useful for determining a signal strength, and wherein the data receiver is used for a data signal. Generally an agent includes a processor for operating software for facilitating the functions of the invention. For example, software may provide a means for associating a strength signal with a data signal. The signal receiver and the data receiver are typically the same unit. A memory is also included in the agent for storing received data as well as data generated by the agent. Assuming that the agent operates on digital data, an analog to digital converter can be provided to generate a digital representation of the strength of incoming signals. The agent may also include a transmitter for sending signals to other, locally spaced, agents. Both the transmitter and receiver may be directional in nature. Agents may also include many other features such as additional sensors for detecting properties of the environment and additional communication mechanisms as well as mechanisms to provide mobility.

Analog to Digital Converter—The term analog to digital converters as used herein is intended to include any analog to digital conversion mechanism useful for generating a digital representation of the strength (or power level) of an incoming signal.

Angular Region—With reference to a signal transmitter or receiver, the term angular region is intended to indicate an arc (either in two dimensions or three) representing the angular granularity used for determining the direction (either with respect to the agent or with respect to another reference point) from which a signal is transmitted or received.

Cumulative Data Portion—The cumulative data portion of the a signal is a place within the signal where data intended to be modified (typically with local data) at each hop across a plurality of agents is kept. The modification of the cumulative data portion may be performed simply as an increment/decrement of a hop count, or it may be more complex, incorporating local data derived from sensors on board an agent. Combined with a direction from which it is received, the cumulative data portion can represent a quality of a gradient path across a plurality of agents.

Local—The term local as used herein is intended to be indicative of a close range, the exact distance of which varies with the particular embodiment. Preferably, local indicates that communication between agents is limited to nearby agents such as those immediately neighboring an agent. Depending on the level of agent congestion, the physical range at which agents are considered to be local with respect to one another may be varied by altering transmission power or receiving sensitivity. This can, for example, prevent an agent from losing contact with the other agents by extending the communication range of that agent. On the other hand, it can also prevent packet collisions from excessively disrupting communications by reducing the communication ranges of a group of agents.

Signal Receiver—A signal receiver for use with the present invention is preferably operational with a communication medium exhibiting qualities including a high directionality, easy modulation, and an intensity that decreases with increased distance from the sender such that it may be used effectively for distance estimation. Examples of mediums satisfying these criteria include optical, acoustic, and radio frequency signals. The preferred medium is infrared radiation. It is further preferred that the signal receiver be functional for determining the direction from which an incoming signal is received. Thus, in the case of an infrared receiver, several individual directional receivers may be incorporated to form a directional receiver, with each of the individual receivers being responsible for receiving in a particular direction with respect to an agent. The individual receivers may be grouped in various ways to form receiving patterns. This grouping may be performed either in hardware or by grouping the information received from the receivers using software (e.g., by storing the information from each group of receivers in a particular bin in memory and operating on the information in each bin as a group).

Signal Transmitter—A signal transmitter for use with the present invention is preferably operational with a communication medium exhibiting qualities including a high directionality, easy modulation, and an intensity that decreases with increased distance from the sender such that it may be used effectively for distance estimation. Examples of mediums satisfying these criteria include optical, acoustic, and radio frequency signals. The preferred medium is infrared radiation. It is further preferred that the signal transmitter be functional for determining the direction in which an outgoing signal is transmitted. Thus, in the case of an infrared transmitter, several individual directional transmitters may be incorporated to form a directional transmitter, with each of the individual transmitters being responsible for transmitting in a particular direction with respect to an agent. The individual transmitters may be grouped in various ways to form transmitting patterns. This grouping may be performed either in hardware or by distributing the information transmitted among the transmitters using software.

Data Signal—The term data signal is used herein simply to indicate a signal intended to transmit information between agents.

Message Signal—Although it is possible to transmit a data signal and a strength signal separately (e.g, the strength signal could be in a medium which loses strength in proportion to distance rapidly such as an acoustic signal, whereas the data signal could be in a medium that loses strength in proportion to distance slowly such as a laser), it is desirable that the signal that transmits information between agents be the same signal used in determining signal strength. Therefore, the term message signal is simply used as a convenient label for indicating a signal used both for transmitting information between agents and in determining signal strength.

Strength Signal—The term strength signal is used herein simply to indicate a signal intended to facilitate determination of its strength.

Type—Type is generally used to indicate a particular class of cumulative data (which is modified by a particular class of local data). For example, in a case where two types of cumulative data are used, and one message structure is used wherein a cumulative data portion of the messages have the same addresses within the message structure, a type portion should also be provided to prevent undesired mixing and confusion between the different types of cumulative data. More tangibly, in a case where a cumulative signal strength measure and a cumulative measure of a particular toxin are passed through a plurality of agents, it is desirable to provide a means for separating the cumulative data representing the different cumulative measures. This is a goal of the type.

Introduction

The present invention provides a method and an apparatus for signaling among a plurality of agents. More specifically, the signaling is designed to support communication between nearest neighbor transceivers. The agents of the present invention may be roughly viewed as signal filters. Messages are received by the agents, and the agents select only the "best" messages according to some criteria either for processing internally or for re-transmission to the local neighboring agents of the receiving agent, or a combination of the both. Thus, in the communication scheme disclosed herein, there is no need to keep track of unique agent identifications or addresses.

In a simple case, the selection of a signal may be based on signal strength. Assuming that all agents are transmitting with the same power level, the signal strength can serve as a measure of distance or as a measure of the opacity of the environment with respect to the particular type of signal. A cumulative measure of the signal strength may be kept with the signal while it is passed among the agents. At each agent, a direction from which a signal was received may be maintained, and the strength of the locally received signal may be added to the cumulative measure. In this manner, it is possible to gain a rough estimate for the overall opacity of a particular path (potentially the "best" path) through the agents or a rough estimate of the path length.

In a variant of this scheme, messages can be moved in a specific direction through a group of agents if directional transmitters are employed. The same mechanism can be used for obstacle sensing, if the agent can identify when a message that was just transmitted is received unchanged (i.e., the signal is reflected).

The signaling method incorporated in the present invention may also be envisioned as loosely analogous to the properties of chemical pheromones used by social insects such as ants and termites. In nature, pheromones and pheromone gradients based on local signals are used extensively to produce organized group activities that appear very sophisticated despite the fact that each individual insect may be relatively simple. The signaling mechanism described herein is useful in robotic applications where there is a need to enable a large number of cooperating robots to exhibit many of the emergent self-organizing properties of insect colonies. It also supports additional capabilities by virtue of the ability of the messages to carry additional information.

Some key properties of the signaling mechanism of the present invention are used to facilitate group organization. First of all, a sender of a message need not be concerned with the identity of the recipient, nor does the sender need any guarantee that the message has even been received. This makes the messaging system ideal for communication within large populations of simple agents where the implementation of complex protocols or the coding of unique identities may be impractical. The messages provide important navigational cues to members of a group by way of the directional intensity gradients created from message diffusion. Diffusion gradients also encode useful information about barriers in the environment since physical obstacles may block message propagation. Another key property of the signaling system described herein is the ability to decay or eliminate stored messages over time if they are not replaced. This prevents cluttering the plurality of agents with obsolete or irrelevant information.

Specifics of the Present Invention

An example of a simple agent with a directional signaling mechanism is depicted in FIG. 1. As shown, the agent 100 includes a digital processor 102, a transmitter 104, and a receiver 106. The transmitter 104 is depicted in the figure as an omni directional transmitter. However, depending on the requirements of a particular embodiment, the transmitter 104 may be a directional transmitter configured similarly to the receiver 106. The receiver 106 is depicted as a directional receiver having a plurality of angular regions 108 for receiving signals coming from particular angles with respect to the agent. The individual angular regions 108 of the receiver 106 may be selectively combined in order to vary the angular accuracy (or tolerance) in determining the direction from which a signal is received. The individual angular regions 108 may be grouped either by proximity to each other (e.g., grouping neighboring angular regions 108) or they may be grouped in patterns (e.g., grouping angular regions 108 in front of the agent 100 with those in back of the agent 100).

Although it is preferable that the same signal be used for transmitting data and for determining signal strength, is also conceivable that the receiver 106 comprise different components for receiving different components of a signal. For example, the agents 100 may include a transmitter specifically for transmitting a signal from which signal strength is to be inferred and a transmitter specifically for transmitting a command (data). In an embodiment of this example, the transmitter 104 could provide a red beacon for from which another agent 100 may determine its signal strength and correlate its distance. The commands could be transmitted via a blue beacon. Therefore, if an agent 100 was programmed to respond only to signals from an agent 100 at a particular distance within a given time frame, the agent 100 could simply wait for the proper combination of a red beacon and a blue beacon before it reacts to a command. In this embodiment, the agent 100 would typically have a signal receiver for receiving a strength signal, a data receiver for receiving a data signal (e.g., a command), a means for associating each data signal with a strength signal, and a means for selecting a data signal based on the strength of the associated strength signal. The means for associating each data signal with a strength signal could, for example, be based on the direction from which a signal was received. The means for selecting a data signal based on the strength of the associated strength signal is typically in the form of software operating on the processor of the agent 100, which processes the received signal strengths in order to make a selection. Thus, as mentioned in the introduction, the agent can simply act as a sifter, waiting for the proper combination of signal strength and command before reacting.

The transmitter 104 and the receiver 106 may operate using various communication medium, non-limiting examples of which include optical, radio frequency (RF), and acoustic mediums. It is desirable that the communication medium be highly directional, easily modulated, and that it lose intensity with increased distance from the sender. The directional property is needed to permit directional signaling and is useful for the development of path gradients. Modulation is needed to encode the message type and other data. Distance drop-off is useful for allowing agents to estimate their distance from the sender. It is further desirable that the communication medium provide for line-of-sight propagation to ensure that message gradients do not pass through walls or other obstacles, although some applications of this system may use a signaling medium that is not limited to line-of-sight signaling. The preferred medium for use with the present invention is infrared (IR) used in conjunction with a directional transmitter and a directional receiver. Note that although depicted as a two-dimensional perimeter of angular regions, the receiver 106 could also take the form of a three-dimensional directional receiver. The same concept could also be applied to the transmitter 104.

Figure 2:
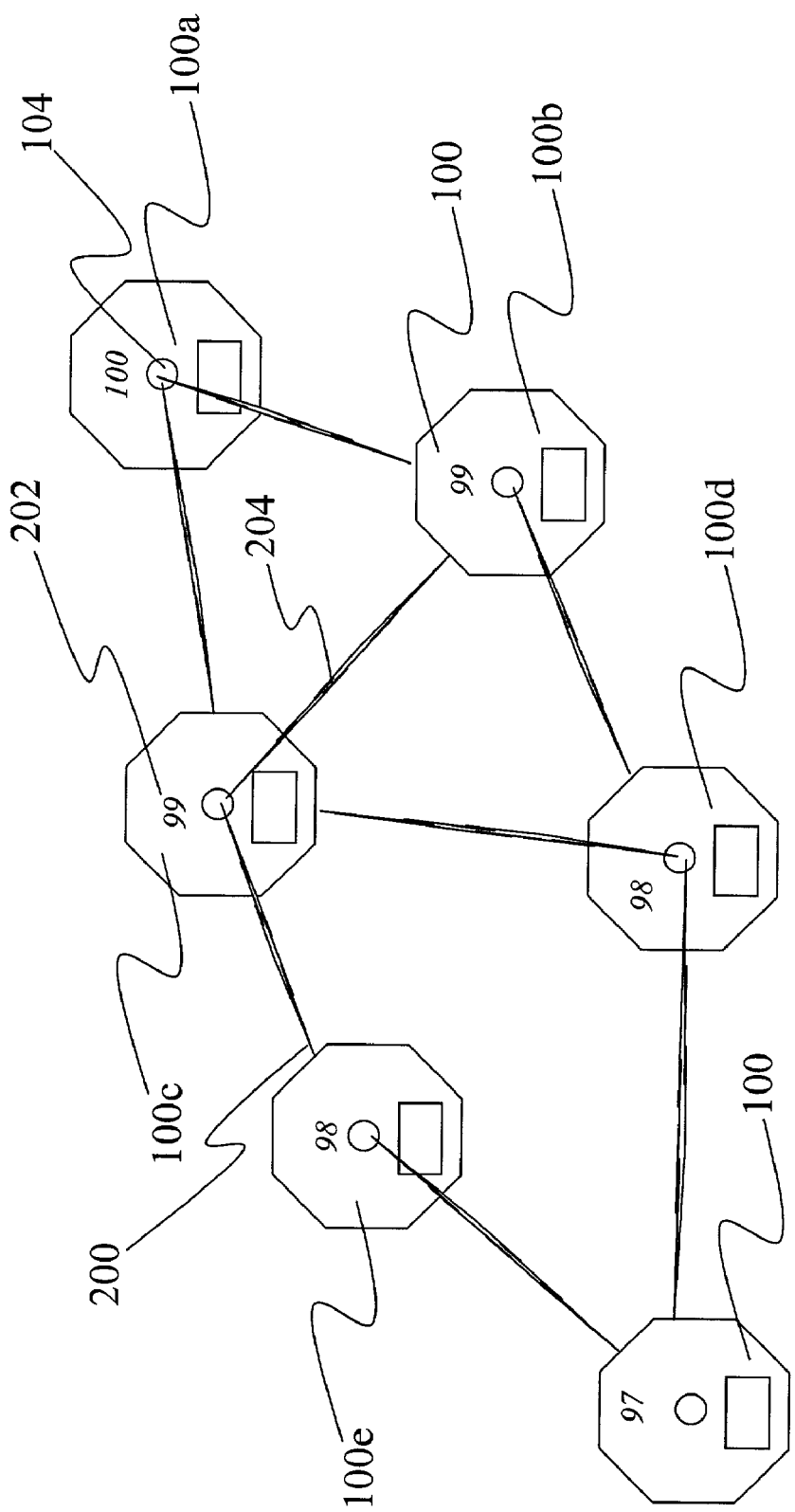
FIG. 2 is a perspective view of depicting several directional signaling mechanisms as shown in FIG. 1, and demonstrating a hop-count-based signaling scheme.

A perspective view of agents 100 with directional signaling mechanisms is depicted in FIG. 2. The agents 100 are each shown transmitting a signal 200 for receipt by another agent 100. A cumulative data portion 202 is shown relative to each signal 200. The agent 100 includes means for modifying the cumulative data portion 202. Typically, local data is used to modify the cumulative data portion 202 in order to generate a modified (or new) cumulative data portion for further transmission. In the scenario depicted, the cumulative data portion 202 is represented as an integer hop count, starting with an initial value of 100 and decremented with each hop through the plurality of agents 100. For purposes of the plurality of agents 100 depicted in FIG. 2, the transmitters 104 of the agents 100 are assumed to be directional transmitters, transmitting messages away from the agent 100 from which a signal is received. For illustration, the first agent 100*a* begins with a value of 100 stored in cumulative data portion and transmits a signal including the cumulative data portion 202, which is received by its local neighbor agents 100*b* and 100*c*. The neighbor agents 100*b* and 100*c* then decrement the value stored in the cumulative data portion by a factor of 1, representing the fact that the signal has incurred one hop between the first agent 100*a* and the neighbor agents 100*b* and 100*c*. Next, the agents 100*b* and 100*c* transmit signals with cumulative data portion values of 99 in a direction away from the first agent 100*a*, with the signal from agent 100*b* being received by agent 100*d* and with the signal from agent 100*c* being received by agent 100*b* and 100*e*. Note that the signal from agent 100*c* is transmitted to agent 100*b* with a lower value stored in its cumulative data portion (99) than in the cumulative value portion of the signal from agent 100*a* (100). In cases where an agent 100 receives two signals, one with a higher value stored in the cumulative data portion and one with a lower value stored in cumulative data portion, the agent 100 may be programmed to select the signal with the higher value stored in cumulative data portion, as indicative of a shorter route to the originating agent 100*a*. Note that depending on the particular embodiment, the determination of which signal to select may take place in many different ways. For example, the local data used to modify the cumulative data portion 202 may be given a weight relative to the cumulative data portion 202, or the selection may be made based on different criteria. In some cases, it may be desirable to select the signal in a manner where the data stored in the cumulative data portion meets certain criteria, not simply a highest or lowest value, as indicative of a particular environmental feature. Furthermore, the local data used to modify the cumulative data portion 202 need not simply be a hop count, and could be, for example, a measure determined from the local incoming signal strength (thus keeping a cumulative signal strength measure across a plurality of agents 100), or it may also be developed from other sensors on board the agent. The important aspect of the local data used to modify the cumulative data portion is that it is a measure of some local environmental property, whether the environmental property is a simple hop count, a measure of the signal strength, a measure of the distance to the transmitting agent, a more complex measure determined by other sensors on board the agent, or a combination of properties. Additionally, the agents may be configured to provide multiple types of data in different cumulative data portions 202, each processed independently such that gradients representing different features may be generated in the plurality of agents. Thus, for example, in addition to a simple measure of hop count to an originating agent, a measure of temperature changes (or the highest temperature along the path) or steepness may be generated to provide a broader picture of the environment along the path. The different types of cumulative data may also be "superimposed" to provide composite data while still allowing observation of individual cumulative data component types.

Figure 3:
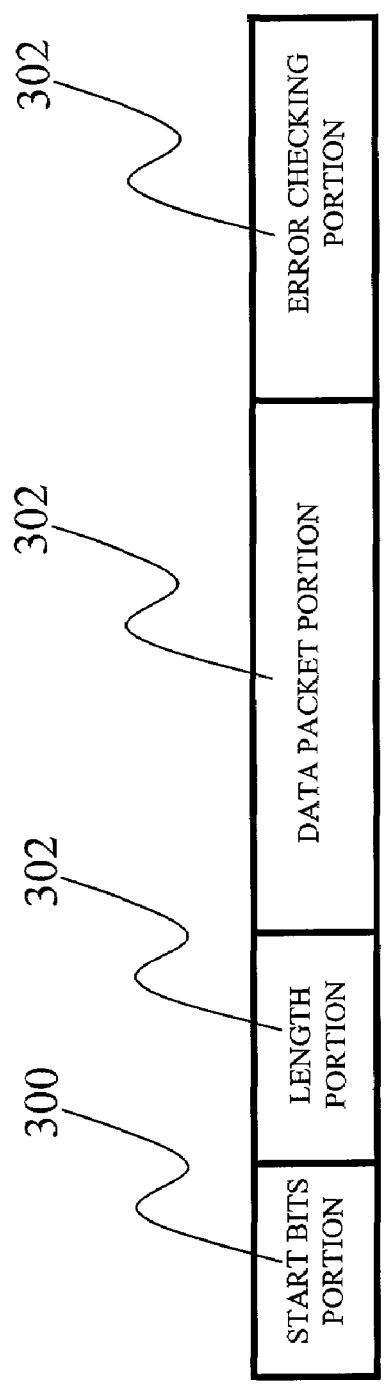
FIG. 3 is a diagram detailing the messaging format of the present invention.

An example of a message structure that may be used in conjunction with the present invention is depicted in FIG. 3. Because of its message validating features, this message structure is particularly useful in an environment where collisions are frequent, and it is used as a wrapper for transmitting a digital data packet, including at least one data element, on the message signal. One advantage of the signaling mechanism of the present invention is that it does not require acknowledgement of messages, and lost messages are acceptable. The message structure includes a start bits portion 300, which provides an indication of the start of a message. This portion is used by an agent 100 in order ensure that it receives a message from its beginning. A length count portion 302 provides the agent 100 with a measure of the message length to expect. This serves as a mechanism to check for completeness of the message and also to facilitate the use of variable-length messages. If variable-length messages are not desired, and a standard length is used, the length count portion 302 is not useful. A data packet portion 304, which will be discussed in greater detail below, allows for the transmission of a cumulative data portion 202, as well as a type and, optionally, other data. An error checking portion 306 is also included in the message structure in order to provide information useful for checking the message to detect errors which may occur during transmission. The error checking portion 306 can assist in cases where multiple messages are received from the same direction and portions of the messages become tangled. Note that although it is preferred that the message structure include a start bits portion 300, a length count portion 302, a data packet portion 304, and an error checking portion 306, one or more of these portions may be eliminated depending on the needs of the particular embodiment. In a simple case, for example, the message structure includes only portions necessary for transmitting a cumulative data portion 202. Note that the start bits portion 300, the length count portion 302 and the error checking portion 306 serve as an example of a mechanism for validating messages. Messages found to be invalid may be removed from memory, or if the invalidity is found during transmission, the message may simply be ignored by the agent 100. Virtually any error checking or packet validating scheme known in the art may be used in conjunction with the present invention.

Figure 4:
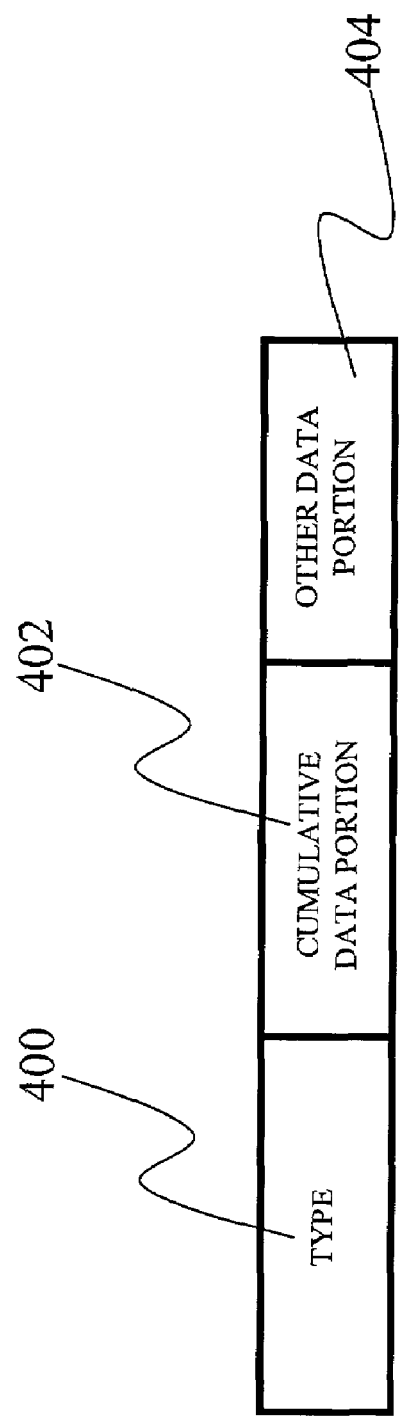
FIG. 4 is a diagram detailing the data packet portion of the message format depicted in FIG. 2.

A preferred format for the data packet portion 304 is shown in FIG. 4. As shown, the data packet portion 304 includes a type portion 400, a cumulative data portion 402, and an other data portion 404. The type portion 400 allows for different types of cumulative data to be transmitted in the same bit locations of different data packet portions 304. For example, it may be desirable to provide a type of cumulative data which is simply a hop count along a path from an originating agent 100. On the other hand, it may also be desirable to provide a type of cumulative data which is a measure of distance along the path from an originating agent 100. Various schemes for developing cumulative data may be incorporated simultaneously by generating different cumulative data types, and indicating the cumulative data type in the type portion 400 of the data packet portion 304. Other schemes using the type portion 400 may be developed. For example, some messages may be designed to provide commands to all of the agents 100, and these messages could be tagged with a specific type to ensure that they are processed as commands by the agents 100. The type portion 400 could also be used to cause the agents 100 to re-transmit a particular message in a particular direction, or to ensure that a particular message is not re-transmitted. Functions such as these could also be implemented through the other data portion 404.

In addition to simply utilizing cumulative data of different types, as suggested previously it is also possible to combine cumulative data of different types in order to generate weighted cumulative data of a new type. This scheme is roughly analogous to the generation of different pictures on different transparencies, and overlaying the different transparencies to generate a composite picture. In the case of the present invention, gradients may be developed for different types of cumulative data, and maintained as separate components in addition to a combined cumulative data gradient.

The cumulative data portion 402 of the data packet portion 304 is used for transmitting the cumulative data to neighboring agents 100. At each agent 100, information including local data is combined with the cumulative data portion 402 of a message received in order to generate a new data packet portion 304 for transmission. As previously mentioned, each cumulative data type may be differentiated through the use of a type portion 400. Again, in the simple case of a cumulative data portion 402 incremented by a hop count, the cumulative data portion 402 transports the current cumulative data to a receiving agent 100, where local data in the form of an incrementing factor (typically 1) is used to augment the current cumulative data to generate a new cumulative data portion (typically equal to the current cumulative data value plus 1). This new cumulative data portion 402 is inserted into the data packet portion 304 for transmission to local neighbor agents 100. This process is repeated as the signal is propagated through the plurality of agents 100.

In some cases, it may be desirable to include data in addition to the cumulative data in the data packet portion 304. In this case, an other data portion 404 may be included in order to facilitate transmission of additional information in the message. For example, if an agent along the path is damaged, it may be desirable to include that information in the other data portion 404 of the data packet portion 304 in order to inform a user of the system that one of the agents 100 is in need of repair. Depending on the particular embodiment, the path to the damaged agent 100 may be included along with the cumulative data at the damaged agent 100 so that the user may find the damaged agent 100. Alternatively, a unique identifier for the damaged agent 100 may be included so that the user may identify the agent directly rather than simply by means of a path to the agent 100 along with the hop count at the agent 100.

Generally, it is desirable to retain the direction from which a signal is received along with the cumulative data associated with the signal in order to encode a gradient. The direction of the gradient at an agent need not be transmitted with a new or modified cumulative data portion.

If multiple messages are received from the same direction with the same type-field value, and the messages do not collide, the receiving agent 100 will generally select the message with the greatest signal intensity for re-transmission. This will help to ensure that messages from only the closest transmitters are considered, and will also provide the receiver with an estimate of the range to its closest neighbors. Variations on this scheme are also contemplated, such as selecting the message based on a predetermined or selected intensity rather than simply based on the greatest intensity. Thus, signals from agents 100 at a particular range may be selected. Additionally, depending on the features provided in a particular embodiment, the selecting of a message may be based on one or more factors, a few examples of which include the local signal strength, features of the digital data packet portion 304 such as the value of the cumulative data portion 402 (non-limiting examples of which include hop count, cumulative signal strength, and other environmental data), the contents of the other data portion 404, the distance estimated from the local signal strength, a time based mechanism such as a time stamp, and the direction from which a signal was received.

Despite the fact that only the nearby neighbors will receive a message transmission, the relay mechanism provided herein allows any single message to potentially propagate through an entire array of agents 100, with each agent 100 connected by an uninterrupted local neighbor communication chain to the originator. Furthermore, it is possible for any recipient to determine an optimal path (which in some cases may represent an approximate distance) to the originator of the message as well as the local gradient that leads toward the originator. These properties are very important, for example, in enabling world-embedded computation-type uses.

Figures 5A, 5B:
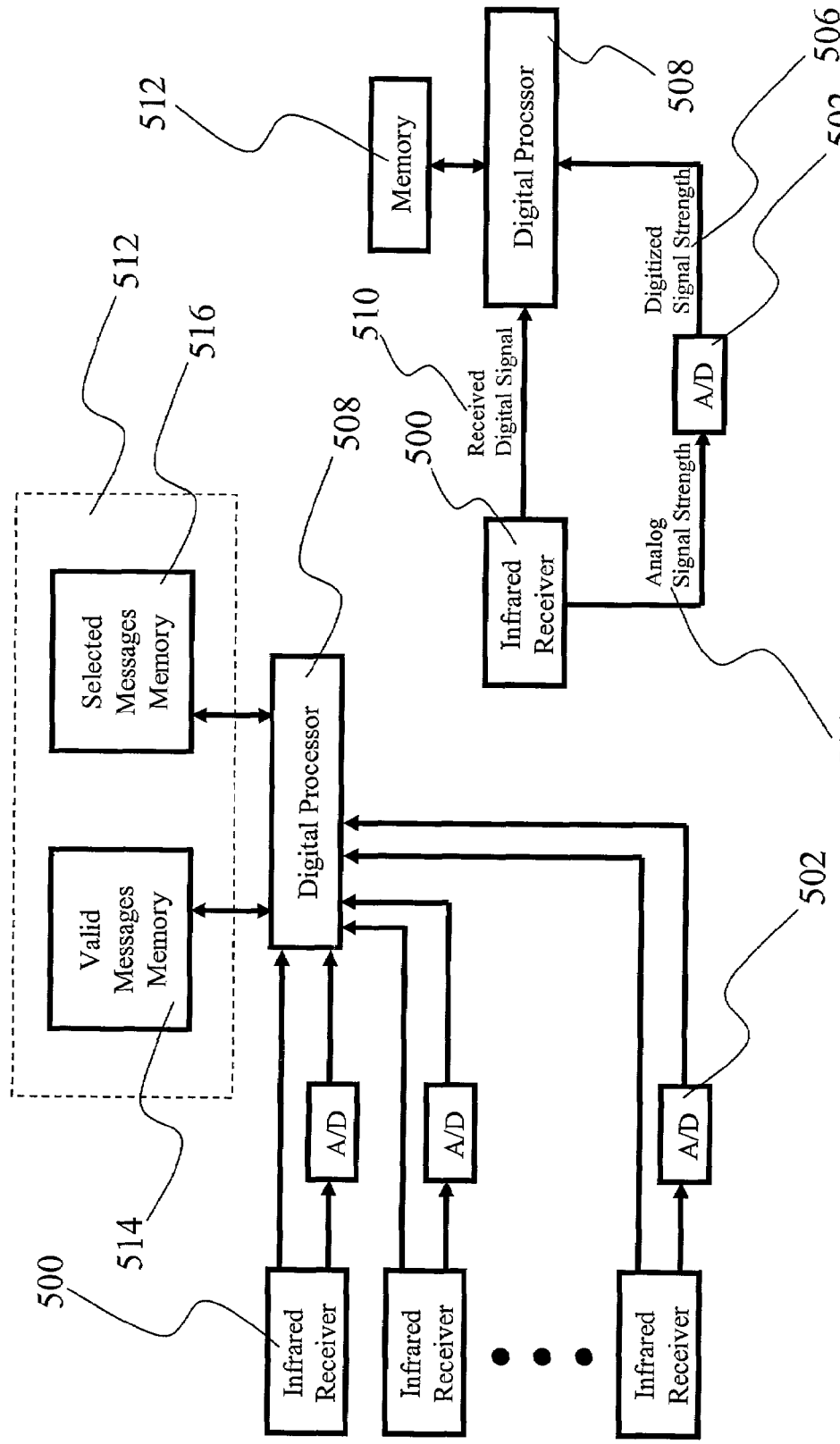
FIG. 5(a) is a block diagram depicting a preferred configuration of the receiver portion of the present invention.
FIG. 5(b) is a block diagram depicting the details of the connection between each infrared receiver and the digital processor of the present invention.

A block diagram depicting a preferred configuration of a receiver portion of the present invention is shown in FIG. 5(a), with details of the connection between each infrared receiver and the digital processor shown in FIG. 5(b). The agents 100 preferably contain a both a receiver portion and a transmitter portion. However, it is envisioned that in some cases, it may be desirable for agents 100 to have only a receiver portion, e.g., to serve only as indicators of the value of the cumulative data portion at certain points without passing on messages themselves, or to have only a transmitter portion, e.g., to serve as beacons for originating signals to be propagated throughout the plurality of agents 100. More detail regarding the receiver portion of the agents 100 will now be presented.

The preferred configuration of the receiver portions is depicted in FIG. 5(a), including an infrared receiver 500 for receiving an incoming digital signal, an analog to digital converter 502 connected with the infrared receiver 500 for receiving the analog signal strength from the digital signal and converting it into a digitized representation of the signal strength. Note that an individual infrared receiver 500 along with a representation of the analog signal strength 504, the analog to digital converter 502, and the digitized signal strength 506 is depicted in FIG. 5(b). Both the analog to digital converter 502 and the infrared receiver 500 are connected with a digital processor 508. The digital processor 508 is configured to receive the received digital signal 510 from the infrared receiver 500 and the digitized signal strength 506 from the analog to digital converter 502. Note that in FIG. 5(a), the infrared receiver 500 is depicted as a plurality of infrared receivers 500, each for receiving a digital signal from a different angular region with respect to the agent 100. Each individual infrared receiver 500 is capable of providing both a data output as well as a signal strength output. When messages are received, the digital processor records the direction and signal strength along with the message content from the digital data packet portion 304 in a memory 512. Preferably, a timestamp is recorded as well.

A memory 512 is supplied, and is preferably divided into a valid messages memory 514 and a selected messages memory 516. The valid messages memory 514 serves as a storage area for messages determined to be valid by a validity checking routine. The selected messages memory 516 serves as a repository for messages that have been selected from the valid messages memory 514 for modification and retransmission. The routines for validating messages for entry into the valid messages memory 514 and for selecting messages from the valid messages memory 514 will be discussed in greater detail below.

Figure 6:
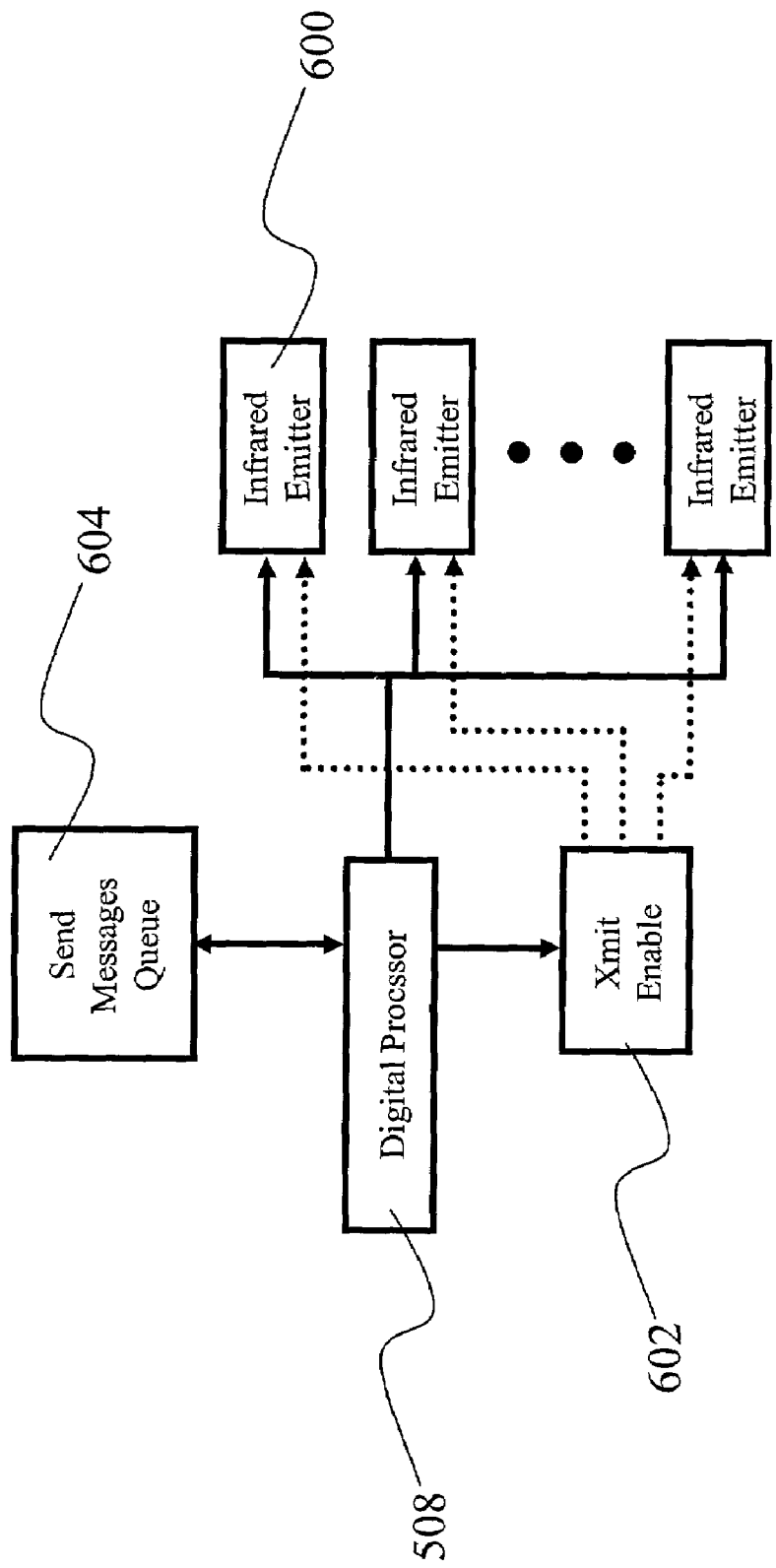
FIG. 6 is a block diagram depicting the details of a directional transmitter portion of the present invention.

A block diagram depicting a preferred embodiment of the transmitting portion of an agent 100 is depicted in FIG. 6. Preferably, the transmitting portion is capable of sending both omni directional and directional messages. The transmitter portion is depicted as a plurality of directional infrared emitters 600, each connected with a transmit-enable unit 602, which can selectively enable ones of the plurality of infrared emitters in order to provide the desired transmission directionality. The transmit-enable unit 602 is controlled by a digital processor 508, which may be the same or may be in addition to the digital processor 508 in the receiving portion. A send messages queue 604 is also provided, in which messages to be sent are prepared for transmission. Generally, a message to be transmitted is sent to all of the infrared emitters 600, but only those enabled will actually transmit.

In some cases, such as when congestion exists among the agents 100 and many signals collide en route to a receiver, it may be desirable to vary the signal strength generated by the transmitting portion of one or more agents 100. The other data portion 404 of the digital data packet portion 304 may include information regarding the signal strength output of the transmitting portion in order to enable the signal strength at a receiving agent 100 to properly reflect its distance from the transmitting agent 100. The receiving agent 100 may then use this information to adjust its processing of the received signal in order to account for the altered signal strength when selecting among signals.

Figure 7:
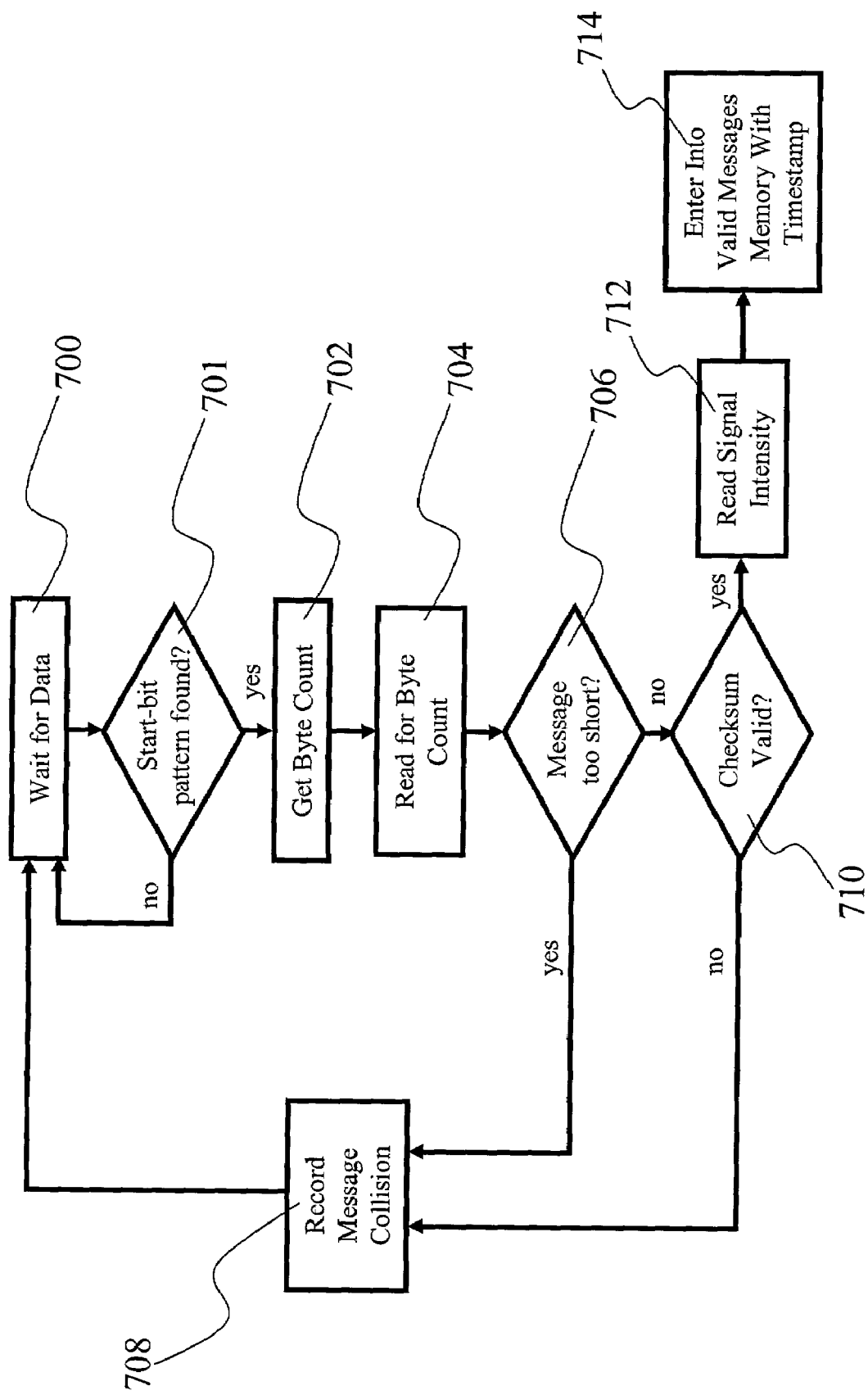
FIG. 7 is a flow chart depicting the steps involved in validating incoming digital signals for storage in the validated messages memory.

A flow chart depicting the steps involved in validating incoming digital signals for storage in the validated messages memory 514 is provided in FIG. 7. As shown, the receiving portion of an agent 100 waits for data 700. Once a digital signal has been received, the receiving portion determines whether the received digital signal includes a start bits portion 701. If no start bits are detected, the agent 100 reverts to waiting 700, waiting to detect another incoming digital signal. If start bits are detected, the receiving portion of the agent 100 then reads the length count portion 302 of the digital data packet portion 304 of the digital signal in order to determine the expected length of the digital signal 702. The receiving portion of the agent 100 then reads the digital signal to determine whether the actual length of the digital signal is equal to the expected length of the digital signal 704. If the message is too short 706, the receiving portion assumes that a message collision 708 has occurred and goes back to the waiting step 700. If the actual message length matches the expected message length, then the receiving portion uses the error checking portion 306 of the received message to determine whether there is an error in the received message 710. If an error is present, the receiving portion assumes that a message collision 708 has occurred and goes back to waiting 700. If no error is present in the message, the receiving portion reads the signal intensity 712 and enters the message into memory along with the signal intensity, the direction, and, preferably, a time stamp 714. Note that in this scheme, all properly received messages are recorded into the valid messages memory 514, along with the signal intensity, the direction, and, preferably, a time stamp.

A table is presented in FIG. 8 in order to provide a narrative description of the steps involved in validating incoming signals. The table represents example fields used in the valid messages memory, along with a group of example entries. The first column in the table is a list of the type portions 800 from various received messages. In the table, messages stored in the valid messages memory 514 are grouped by type. Within each type, the messages are then grouped by direction using a direction column 802. Each unique entry in the direction column 802 (e.g., each unique number appearing in the table in the direction column 802) represents the particular direction, generally relative to the agent 100, from which a message has been received. The value stored in the direction column 802 can correspond to the actual receiver 108 that received the message, or more generally, it may be a in the form of a direction vector in two or three dimensions that points in the direction, with respect to the agent 100, from which the received message was detected. Note that for illustration, bins 804 are defined in the validated messages memory 514, into which signals are grouped. Naturally, messages from each unique number appearing in the table in the direction column 802 are considered to be in the same bin 804, as depicted by 804*a*. However, bins 804 may also be generated as combinations of direction numbers, as depicted by 804*b*, in order to lump individual receivers 500 together to control the directional granularity with which messages are recorded. Specifically, in the case depicted in the table of FIG. 8, messages from bins 0 and 1, 2 and 3, 4 and 5, and 6 and 7 are grouped. Bins 804 may be grouped in any arbitrary manner in order to implement different connectivity grid patterns among the agents 100, e.g., octagonal versus hexagonal versus rectangular. In cases where the agents 100 are mobile, they can move so as to try to maintain one and only one local communicating agent 100 in the direction of each bin 804.

The valid messages memory table also includes a local data column 806, where local data for modifying the cumulative data is stored. The local data may simply be factor by which the cumulative data received should be incremented, or it may be a measure of the intensity of the signal received. As previously mentioned, the local data can be broadly defined as any local environmental property along the path the message traveled to reach the agent 100. A message time stamp column 808 is also provided in order to store time stamps to indicate the time a message was received. The time stamp provides a mechanism for decaying or eliminating messages after they reach a predetermined age. Additionally, a cumulative data column 810 is provided in order to store the information from the cumulative data portion 402 of the message. Finally, an other data column 812 is also included in the table to enable the storage of additional data from the other data portion 404 of the message.

Figure 9:
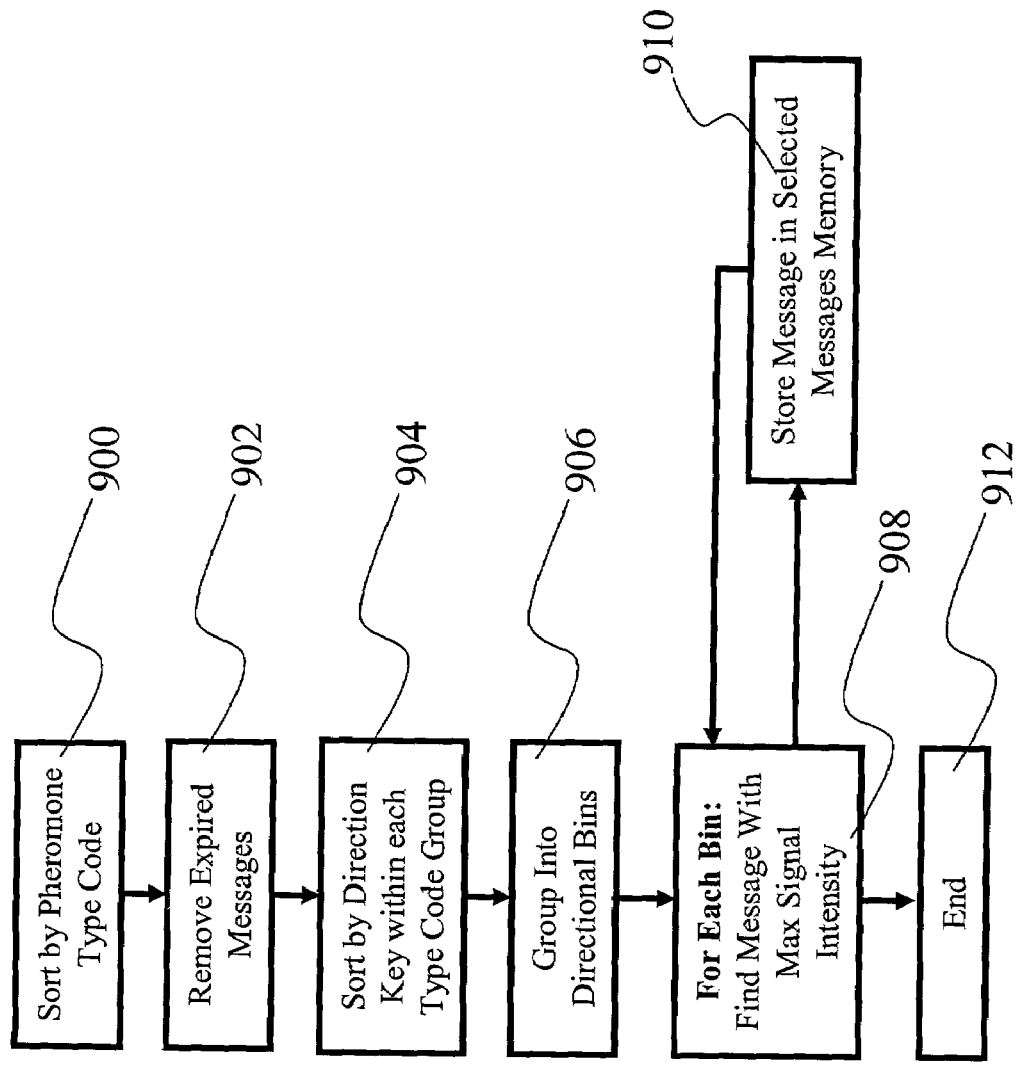
FIG. 9 is a flow chart depicting the steps involved in selecting messages from the validated messages memory for storage in the selected messages memory.

A flow chart depicting the steps involved in selecting messages from the validated messages memory 514 for storage in the selected messages memory 516 is provided in FIG. 9. Generally, the messages are sorted by type in a message type sorting step 900. Next, if the messages are provided with time stamps, the time stamps of the messages are observed and expired messages are removed from the validated messages memory 514 in an expired messages removing step 902. After the expired messages have been removed, the remaining messages are sorted by direction within each type group in a direction sorting step 904. The bins 804 may then be optionally grouped in order to adjust the granularity with which direction is determined in a direction grouping step 906. Next, for each bin 804, the message having the greatest signal intensity is determined in a greatest signal intensity determining step 908. The message from the signal having the greatest intensity is then stored in the selected messages memory 516 in a message storing step 910. The cycle of the greatest signal intensity determining step 908 and the message storing step 910 is repeated for each bin 804, until the moving procedure is completed 912. Note that the steps presented in FIG. 9 do not necessarily have to be performed in the order shown, and may be performed in any order useful for achieving the desired functionality.

Assuming selection based on proximity is desired, the goal of the procedure for moving messages from the validated messages memory 514 to the selected messages memory 516 is to retain, for specified directional bins 804, only those messages that come from the closest transmitting agents 100. To do this, the messages are grouped into directional bins 804, and then only the messages with the strongest signal intensity are selected. The use of two memories (the validated messages memory 514 and the selected messages memory 516) serves to retain alternative messages if the current selected message for a given directional bin 804 should expire. In this case, upon expiration of the selected message from a given directional bin 804, the next best message may be moved into the selected messages memory 516 in its stead. Although discussed as two different memories, it is important to note that the validated messages memory 514 and the selected messages memory 516 may have any configuration desired for a particular embodiment. It is conceivable that they may be in the form of physically separate memories, but generally, they are simply different allocations within the same physical memory.

Note also, for purposes of ensuring that messages from the closest agent 100 in a given direction are used, the local signal intensity (that is, the intensity of the actual signal received rather than the a cumulative intensity measure from the cumulative data portion of a message) of all incoming messages from a particular direction is stored and used. An additional column may be added to the tables in order to represent local data other than the signal strength associated with each message.

A table used as a follow-up to the table depicted in FIG. 8 is presented in FIG. 10 in order to provide a better understanding of the steps involved in selecting messages from the validated messages memory 514 for storage in the selected messages memory 516 and to further illustrate the grouping of directional bins 804. The table depicted in FIG. 10 includes the same columns as those in the table depicted in FIG. 8, and shows the results of operating the steps involved in selecting messages from the validated messages memory 514 for storage in the selected messages memory 516. As may be observed, the messages for each message type have been grouped and sorted by direction. The directions have been combined to form bins 804 within each type by combining bins 0 and 1, 2 and 3, 4, and 5, and 6 and 7. For each bin 804 within each type, the signal having the greatest signal intensity has been selected for inclusion in the table shown in FIG. 10. In particular, note that the between the two entries with type 10 and direction 1 depicted in FIG. 8, the entry (message) with the greatest signal intensity of 22 was selected, indicating that the for direction 1, the entry with the signal intensity of 22 was transmitted from the closest agent 100 in direction 1. With respect to the entry with type 10 and direction 7, there were no other entries (messages) with the same direction. Thus, the entry with signal intensity 34 (the only entry) was selected. With respect to entries with type 22, bins 804 of directions 0 and 1 were combined and the entry having the greatest signal intensity of 66 was selected. The bin 804 for direction 5 had no counterpart for combining (e.g., no entry from direction 4), and thus was selected. The same principles were applied to the entries of types 36 and 65 to generate the table depicted in FIG. 10.

Figure 11:
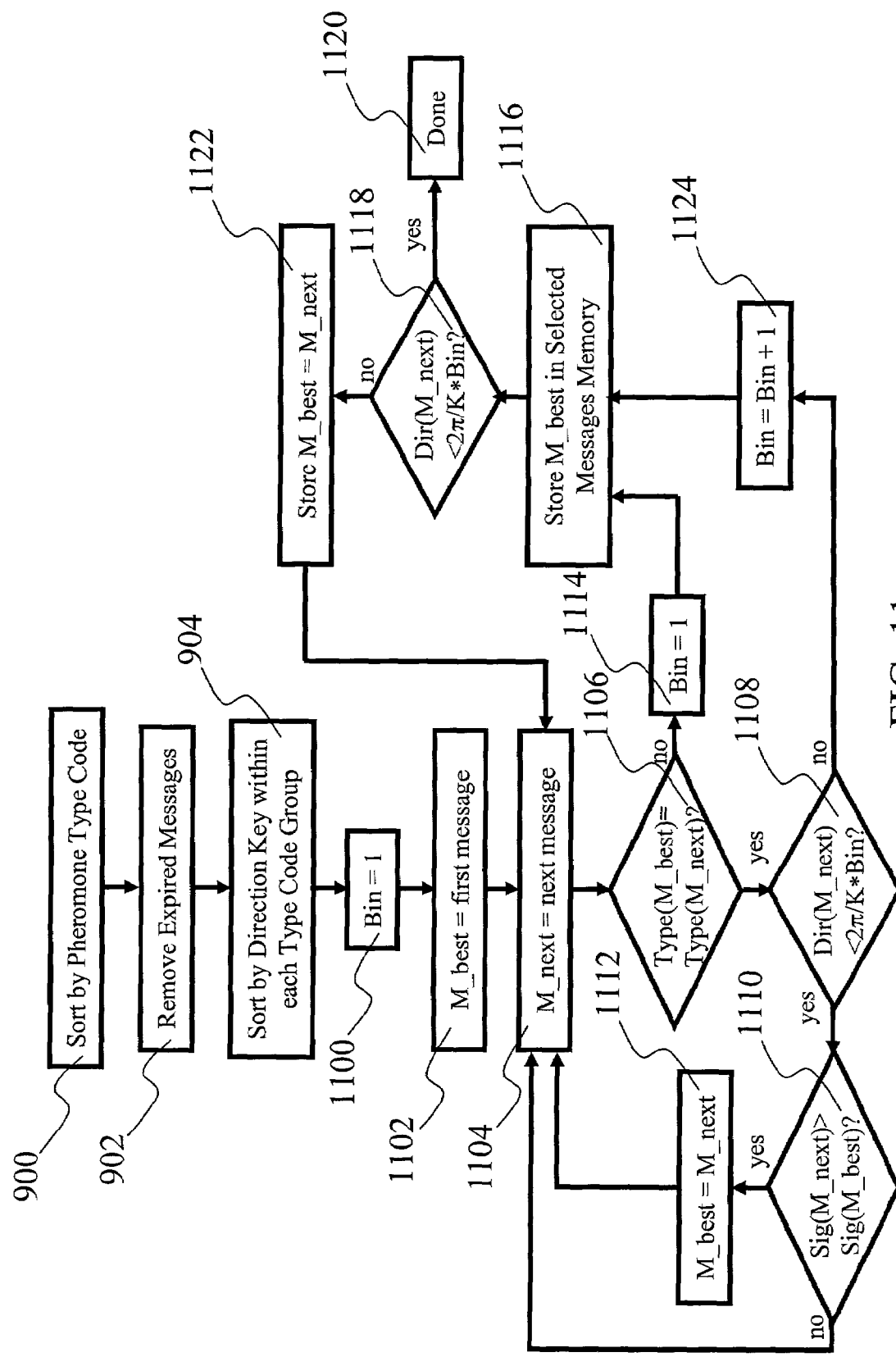
FIG. 11 is a flow chart providing a detailed procedure for selecting messages from the validated messages memory for storage in the selected messages memory.

A yet more detailed flow chart demonstrating the procedure for obtaining selected messages from the valid messages memory 514 for storage in the selected messages memory 516 is presented in FIG. 11. Note that in the procedure depicted by FIG. 11, it is assumed that message directions are stored in radians and that it is desirable to divide the messages into a set of K directional bins 804. As depicted in FIG. 9, the messages are first sorted by type 900. Next, messages having a time stamp in excess of a desired age are eliminated from the memory 902. Then, messages are sorted by direction with each type 904. Subsequently, a bin counter is set to a value of 1 1100 and the first message encountered in the memory is stored in a best message variable 1102. A next message variable is then set with a value equal to the next message in the memory 1104. After setting the next message variable, a type method or subroutine is called to determine whether the field of the best message record is equal to the type message of the next message record 1106. If the field of the best message record is equal to the type message of the next message record, the direction from which the next message originated is checked to determine whether the next message was received in the same angular bin as the current bin (from which the best message was selected) 1108. The relationship used is whether the value in the direction field of the next message record is less than $2\pi/K*Bin$ where $\pi$ is the symbol for Pi, K represents the number of directional bins in a circular set of receivers, and Bin is the bin to which the bin counter was set. If the best message and the next message are from the same bin, the local signal strength (or whatever criteria is used for selecting a best signal) of the best message and the next message are compared to determine whether the next message has a signal strength greater than that of the best message 1110. If the next message has a signal strength greater than that of the best message, the next message replaces the current best message as the best message 1112 and the next message from the memory is stored in the next message variable 1104. If the next message does not have a signal strength greater than that of the best message, the next message does not replace the best message in the best message variable, and the next message from the memory is stored in the next message variable 1104. In either case, once a new message has been stored in the next message variable, the cycle after the storing of the next message from the memory is stored in the next message variable 1104 begins again. If, after a type method or subroutine is called to determine whether the field of the best message record is equal to the type message of the next message record 1106, the type of the best message is determined not equal to the that of the next message, the bin is set (back, if necessary) to 1 1114, and the best message is stored in the selected messages memory 1116. The system then checks to see if another message exists in memory 1118 (this is actually depicted in the chart by determining whether the next message entry in the memory is null). If not, the process is finished and the best message has been selected (typically for modification, if applicable, and transmission) 1120. On the other hand, if another message does exist in memory, the content of the best message variable is set equal to the contents of the next message variable 1122. Subsequently, the next message from the memory is stored in the next message variable 1104, and the cycle after the storing of the next message from the memory is stored in the next message variable 1104 begins again. Referring back to block 1108, if the next message was not received in the same angular bin as the current bin (from which the best message was selected), the bin counter is incremented 1124, and the process passes to storing the best message in the selected message memory 1116, and subsequent steps. Typically, the goal of the message selection process is to determine which message, of those in memory, to modify and re-transmit through the transmitting portion.

After obtaining a set of selected messages, there are several tasks that may be accomplished. For obstacle detection, or for detecting ranges to nearby transmitters, the direction and signal strength, as well as the actual message contents of each message in the selected messages memory may be analyzed. For example, if the same message just transmitted is received (within the time expected for reflection from an object in the communication medium used), it may be assumed that an object was encountered in transmission. The signal strength and the direction from which the signal was received may be observed to generate a distance estimate to the object and a direction to the object.

The signal strength of received signals may also be analyzed to estimate the distance to an agent 100 from which they were transmitted (the calculation is somewhat different than that for determining the distance to an object because of the additional signal strength loss due to the two-way route required for reflection from an object).

Figure 12:
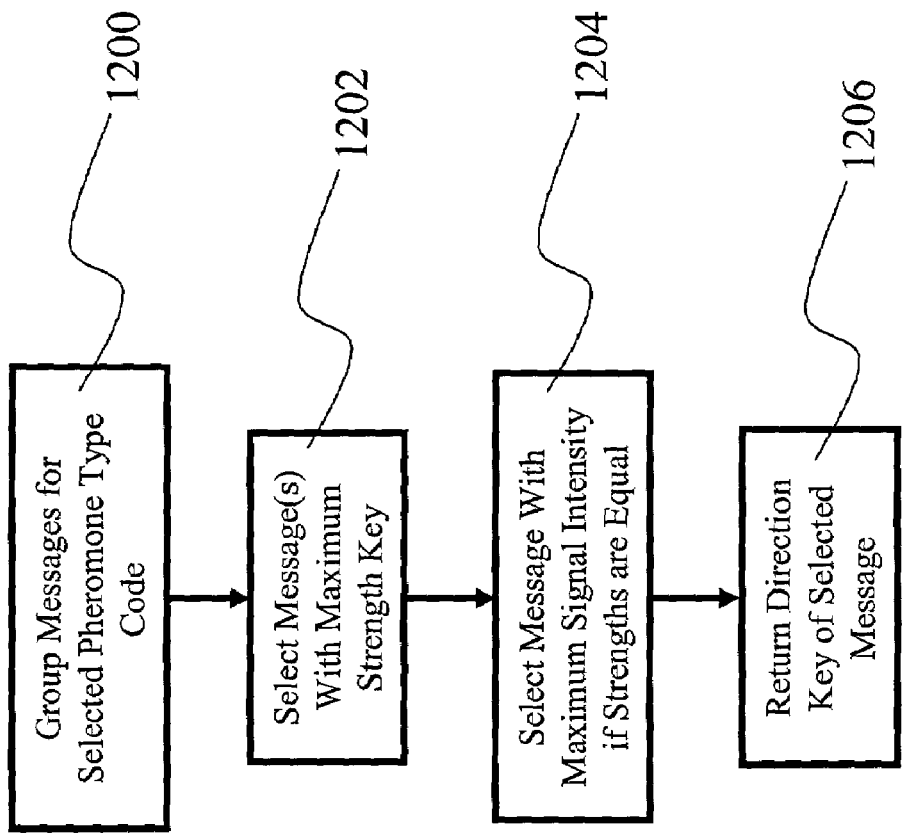
FIG. 12 is a flow chart for determining the direction of the dominant cumulative data (gradient) by determining the direction from which the optimal dominant data portion was received.

Another important task in conjunction with the use of signal strength is the determination of the strongest message of each type. Given a communication medium that loses strength proportionally with increased distance, a cumulative strength measure may be used to determine a shortest path across a plurality of the agents. For each type of cumulative data, a dominant gradient may be determined across a plurality of agents. A flow chart of this process is depicted in FIG. 12. First, messages are grouped by type code 1200. Next, the message with the optimal cumulative data portions 402 (represented in the figure as a maximum cumulative strength value) is selected 1202. If more than one message have an optimal cumulative data portion 402, then a tie-breaker occurs, and the message with the optimal local data (represented in the figure as the greatest local signal strength) is selected 1204 as the final message, and the direction of the final message is returned 1206 as an indication of the direction of the dominant gradient of the type. The process is repeated for each type.

It is also worth noting that the signaling among the agents may take place periodically within predetermined timeframes, so that the selection process may be operated on signals received within a particular timeframe. Signaling in a timeframe is particularly useful for ensuring a constant updating of the information stored in the plurality of agents. The exact signaling timeframe used may vary according to the needs of a particular embodiment.

The operation of the present invention may also be embodied in a computer program product stored on a computer writable medium such as an optical storage device such as a compact disc (CD) or digital versatile disc (DVD), or a magnetic storage device such as a floppy disk or magnetic tape.

What is claimed is:

1. An agent for receiving signals from at least one other locally spaced agent, the agent comprising:
   a. at least one signal receiver for receiving a strength signal having a signal strength from at least one other locally spaced agent;
   b. at least one data receiver for receiving a data signal including data from at least one other locally spaced agent;
   c. means for associating each data signal with a strength signal, where the data signal and the strength signal associated are from the same other locally spaced agent; and
   d. means for selecting a data signal based on its associated strength signal.

2. An agent as set forth in claim 1, wherein the signal receiver and the data receiver are each directional receivers and wherein the means for selecting selects a data signal based on its associated strength and an associated signal direction.

3. An agent as set forth in claim 2, wherein the directional receivers determine direction by receiving digital signals in angular regions.

4. An agent as set forth in claim 3, wherein the angular regions may be selectively combined to allow for different angular accuracy in the determination of the direction from which a digital signal was received.

5. An agent as set forth in claim 1, wherein the agent further comprises a means for approximating a distance from which the strength signal has traveled based on the signal strength of the strength signal.

6. An agent as set forth in claim 1, wherein the signal receiver and the data receiver are incorporated as a single receiver.

7. An agent as set forth in claim 6, wherein the strength signal and the data signal are combined into a message signal including a signal strength and data.

8. An agent as set forth in claim 7, wherein the agent is configured for receiving the message signal in the form of a digital data packet having a data portion with at least one element.

9. An agent as set forth in claim 8, further comprising:
 a. a digital processor connected with the receiver for receiving the digital data packet;
 b. an analog to digital converter connected with the receiver and with the digital processor for digitizing the signal strength and for providing the digitized signal strength to the digital processor; and
 c. a memory connected with the processor for storing digital data packets.

10. An agent as set forth in claim 9, wherein the agent further comprises a means for time stamping received digital data packets and for storing the time stamped received digital data packets in memory along with the digital data packets.

11. An agent as set forth in claim 10, wherein the means for selecting the data signal selects a message based on at least one element selected from the group consisting of the digital data packet, the signal strength, and the time stamp.

12. An agent as set forth in claim 9, wherein the means for selecting the data signal selects a message signal based on its digital data packet and signal strength.

13. An agent as set forth in claim 10, further comprising a means for checking the validity of received digital data packets, and wherein digital data packets found invalid are removed from the memory.

14. An agent as set forth in claim 13, wherein the signal receiver and the data receiver are each directional receivers and wherein the means for selecting selects a data signal based on its associated signal strength and an associated signal direction.

15. An agent as set forth in claim 14, wherein the directional receivers determine direction by receiving digital signals in angular regions.

16. An agent as set forth in claim 15, wherein the angular regions are represented as bins in the memory, wherein the bins may be selectively combined to allow for different angular accuracy in the determination of the direction from which a digital signal was received.

17. An agent as set forth in claim 13, wherein the agent is configured for receiving the message signals of different types, and wherein the means for selecting is operated independently for signals of each type.

18. An agent as set forth in claim 13, wherein the agent is configured to receive message signal including digital data packets each including at least one cumulative data portion, and wherein the agent further comprises a means for modifying the cumulative data portion.

19. An agent as set forth in claim 18, wherein the agent further comprises a means for generating local data, and wherein the means for modifying the cumulative data portion of the digital data packets uses the local data for modifying the cumulative data portion.

20. An agent as set forth in claim 18, wherein the means for selecting the data signal selects a message based on at least one element selected from the group consisting of the digital data packet, the signal strength, the time stamp, and the cumulative data portion of the digital packets.

21. An agent as set forth in claim 20, wherein the agent is configured for receiving the message signals of different types, and wherein the means for selecting is operated independently for signals of each type.

22. An agent as set forth in claim 20, wherein the cumulative data portion includes a cumulative strength measure, and wherein means for modifying the cumulative data portion of the digital packets uses the signal strength from the strength signal to modify the cumulative strength measure.

23. An agent as set forth in claim 22, wherein the signal receiver and the data receiver are each directional receivers and wherein the means for selecting selects a data signal based on its associated strength and an associated signal direction.

24. An agent as set forth in claim 23, wherein the directional receivers determine direction by receiving digital signals in angular regions.

25. An agent as set forth in claim 24, wherein the angular regions are represented as bins in the memory, wherein the bins may be selectively combined to allow for different angular accuracy in the determination of the direction from which a digital signal was received.

26. An agent as set forth in claim 25, further comprising a transmitter connected with the processor for transmitting a digital signal including a digital packet to at least one other locally spaced agent.

27. An agent as set forth in claim 26, further comprising a means for detecting when the same signal just transmitted by the transmitter is received back in the receiver in order to detect reflection from objects near the agent and a means for determining the signal strength of the signal and for using the signal strength to approximate the distance of an object from the agent.

28. An agent as set forth in claim 26, wherein the receivers are selected from the group consisting of optical receivers, acoustic receivers, and radio frequency receivers.

29. An agent as set forth in claim 26, wherein the receivers are infrared receivers.

30. An agent as set forth in claim 26, wherein the transmitters are directional transmitters.

31. An agent as set forth in claim 30, wherein the directional transmitters transmit by sending signals in angular regions.

32. An agent as set forth in claim 31, wherein the angular regions into which the transmitters transmit are represented as bins in the memory, wherein the bins may be selectively combined to allow for different angular breadth for the signal transmission.

33. An agent as set forth in claim 26, wherein the transmitters are selected from the group consisting of optical receivers, acoustic receivers, and radio frequency receivers.

34. An agent as set forth in claim 26, wherein the transmitters are infrared transmitters.

35. An agent as set forth in claim 26, wherein the transmitter is configured to transmit a signal including a data packet including the modified cumulative data portion of the selected signal.

36. An agent as set forth in claim 26, wherein the transmitted signals have transmission strengths, and wherein the transmitter may be configured to vary the transmission strength.

37. An agent as set forth in claim 36, wherein the data packet transmitted further includes a data packet including information regarding the transmission strength of the transmitted signals whereby the means for selecting an agent receiving the signal can account for the altered signal strength of the signal when selecting among signals.

38. A method for communicating among a plurality of agents, the method comprising:
   a. receiving, at an agent from another locally spaced agent, at least one strength signal having a signal strength;
   b. receiving, at an agent from another locally spaced agent, at least one data signal including data;
   c. associating each data signal with a strength signal, where the data signal and the strength signal associated are from the same other locally spaced agent; and
   d. selecting a data signal based on its associated strength signal.

39. A method for communicating among a plurality of agents as set forth in claim 38, wherein in the receiving steps, strength signals and the data signals are each received from a direction, and wherein in the selecting step, the data signal is selected based on its associated strength signal and the direction from which it was received.

40. A method for communicating among a plurality of agents as set forth in claim 39, wherein in the receiving steps, the directions from which the strength signals and the data signals are received are angular regions.

41. A method for communicating among a plurality of agents as set forth in claim 40, wherein the receiving steps further comprise a step of selectively combining angular regions from which signals may be received to allow for different angular accuracy in the determination of the direction from which a digital signal is received.

42. A method for communicating among a plurality of agents as set forth in claim 38, further comprising a step of approximating a distance from which a strength signal has traveled based on the signal strength of the strength signal.

43. A method for communicating among a plurality of agents as set forth in claim 38, wherein the strength signal and the data signal are received in the same receiving step.

44. A method for communicating among a plurality of agents as set forth in claim 43, wherein in the receiving step, the strength signal and the data signal are received as a single message signal.

45. A method for communicating among a plurality of agents as set forth in claim 44, wherein in the receiving step, the message signal is received in the form of a digital packet having a data portion with at least one element.

46. A method for communicating among a plurality of agents as set forth in claim 45, further comprising the steps of digitizing the signal strength of the message signal for receipt by a digital processor and storing the digital data packets in a memory.

47. A method for communicating among a plurality of agents as set forth in claim 46, the method further comprising the step of time stamping the received digital data packets, and wherein in the step of storing the digital packets in a memory, the time stamps of the received digital data packets are stored in memory along with the digital data packets.

48. A method for communicating among a plurality of agents as set forth in claim 47, wherein in the selection step, the selection of a message is based on at least one element selected from a group consisting of the digital data packet, the signal strength, and the time stamp.

49. A method for communicating among a plurality of agents as set forth in claim 46, wherein in the selection step, the selection of a message is based on the digital data packet and the signal strength.

50. A method for communicating among a plurality of agents as set forth in claim 49, further comprising the steps of checking the validity of received digital packets and removing digital packets found invalid from memory.

51. A method for communicating among a plurality of agents as set forth in claim 50, wherein in the receiving step, the signals are each received from a direction, and wherein in the selecting step, the data signal is selected based on its associated strength signal and the direction from which it was received.

52. A method for communicating among a plurality of agents as set forth in claim 51, wherein in the receiving steps, the directions from which the strength signals and the data signals are received are angular regions.

53. A method for communicating among a plurality of agents as set forth in claim 52, wherein the receiving steps further comprise a step of selectively combining angular regions from which signals may be received to allow for different angular accuracy in the determination of the direction from which a digital signal is received.

54. A method for communicating among a plurality of agents as set forth in claim 50, wherein in the receiving step, message signals of different types are received, and wherein the step of selecting is operated independently for signals of each type.

55. A method for communicating among a plurality of agents as set forth in claim 50, wherein in the receiving step, messages are received including digital packets, each including at least one cumulative data portion, and the method further comprising a step of modifying at least one cumulative data portion of the digital packets.

56. A method for communicating among a plurality of agents as set forth in claim 55, further comprising a step of generating local data, and the modifying step uses the local data for modifying the cumulative data portion.

57. A method for communicating among a plurality of agents as set forth in claim 55, wherein in the selecting step, a message is selected based on at least one element selected from a group consisting of the digital data packet, the signal strength, the time stamp, and the cumulative data portion of the digital packets.

58. A method for communicating among a plurality of agents as set forth in claim 57, wherein in the receiving step, message signals of different types are received, and wherein the step of selecting is operated independently for signals of each type.

59. A method for communicating among a plurality of agents as set forth in claim 57, wherein in the receiving step, the cumulative data portion of the signal received includes a cumulative strength measure, and wherein in the modifying step, signal strength of the received signal is used to modify the cumulative strength measure of the cumulative data portion.

60. A method for communicating among a plurality of agents as set forth in claim 59, wherein in the receiving step, the signal is received from a direction and wherein in the selecting step, the signal is selected based on the direction from which it was received.

61. A method for communicating among a plurality of agents as set forth in claim 60, wherein in the receiving step, the directions from which signals are received are angular regions.

62. A method for communicating among a plurality of agents as set forth in claim 61, wherein the receiving step further comprises a step of selectively combining angular regions from which signals may be received to allow for different angular accuracy in the determination of the direction from which a digital signal is received.

63. A method for communicating among a plurality of agents as set forth in claim 62, further comprising the step of transmitting a digital signal, including a digital packet, from the agent to at least one other locally spaced agent.

64. A method for communicating among a plurality of agents as set forth in claim 63, further comprising a step of detecting when the same signal just transmitted by the transmitter is received back in the receiver in order to detect reflection from objects near the agent, and a step of determining the approximate distance from an object based on the strength of the signal received.

65. A method for communicating among a plurality of agents as set forth in claim 64, wherein in the receiving step, the signals received are from the group consisting of optical signals, acoustic signals, and radio frequency signals.

66. A method for communicating among a plurality of agents as set forth in claim 64, wherein in the receiving step, the signals received are infrared signals.

67. A method for communicating among a plurality of agents as set forth in claim 63, wherein in the transmitting step, the digital signal is transmitted in a direction.

68. A method for communicating among a plurality of agents as set forth in claim 67, wherein in the transmitting step, the digital signal is transmitted in an angular region.

69. A method for communicating among a plurality of agents as set forth in claim 68, wherein in the transmitting step further comprises a step of selectively combining angular regions to which signals are transmitted to allow for different angular accuracy in the determination of the direction to which a digital signal is transmitted.

70. A method for communicating among a plurality of agents as set forth in claim 63, wherein in the transmitting step, the signals transmitted are from the group consisting of optical signals, acoustic signals, and radio frequency signals.

71. A method for communicating among a plurality of agents as set forth in claim 70, wherein in the transmitting step, the signals transmitted are infrared signals.

72. A method for communicating among a plurality of agents as set forth in claim 63, wherein in the transmitting step, the signal transmitted includes a data packet including the modified cumulative data portion of the selected signal.

73. A method for communicating among a plurality of agents as set forth in claim 63, wherein the transmission step further comprises a step of optionally varying the transmission strength.

74. A method for communicating among a plurality of agents as set forth in claim 63, wherein in the transmission step, that data packet transmitted includes information regarding the transmission strength of the transmitted signals, and wherein the selecting step further comprises a sub-step of using received information regarding the transmission strength to account for the altered strength of a signal when selecting from among signals.

75. A computer program product for use in facilitating communication among a plurality of agents, the computer program product comprising:

a. means for receiving, at an agent from another locally spaced agent, at least one strength signal having a signal strength;

b. means for receiving, at an agent from another locally spaced agent, at least one data signal including data;

c. means for associating each data signal with a strength signal, where the data signal and the strength signal associated are from the same other locally spaced agent; and d. means for selecting a data signal based on its associated strength signal.

76. A computer program product for use in facilitating communication among a plurality of agents as set forth in claim 75, wherein the means for selecting enables the data signal to be selected based on its associated strength signal and a direction from which it was received.

77. A computer program product for use in facilitating communication among a plurality of agents as set forth in claim 76, wherein the computer program product provides a means for selectively combining angular regions from which signals may be received to allow for different angular accuracy in the determination of the direction from which a digital signal is received.

78. A computer program product for use in facilitating communication among a plurality of agents as set forth in claim 75, further comprising a means for approximating a distance from which a strength signal has traveled based on the signal strength of the strength signal.

79. A computer program product for use in facilitating communication among a plurality of agents as set forth in claim 75, further comprising a means for time stamping received digital data packets and for storing the digital packets in a memory along with associated time stamps.

80. A computer program product for use in facilitating communication among a plurality of agents as set forth in claim 79, further comprising a means for selecting a message is based on at least one element selected from a group consisting of a digital data packet, a signal strength, and a time stamp.

81. A computer program product for use in facilitating communication among a plurality of agents as set forth in claim 75, further comprising a means for selecting a message based on the digital data packet and the signal strength.

82. A computer program product for use in facilitating communication among a plurality of agents as set forth in claim 81, further comprising a means for checking the validity of received digital packets and removing digital packets found invalid from memory.

83. A computer program product for use in facilitating communication among a plurality of agents as set forth in claim 82, wherein the means for selecting enables the data signal to be selected based on its associated strength signal and a direction from which it was received.

84. A computer program product for use in facilitating communication among a plurality of agents as set forth in claim 83, wherein the computer program product provides a means for selectively combining angular regions from which signals may be received to allow for different angular accuracy in the determination of the direction from which a digital signal is received.

85. A computer program product for use in facilitating communication among a plurality of agents as set forth in claim 82, configured for use with signals received of different types, whereby the means for selecting is operated independently for signals of each type.

86. A computer program product for use in facilitating communication among a plurality of agents as set forth in claim 82, further comprising a means for modifying at least one cumulative data portion of a digital packet.

87. A computer program product for use in facilitating communication among a plurality of agents as set forth in claim 86, further comprising means for receiving local data and wherein the means for modifying the cumulative data portion uses the local data for modifying the cumulative data portion.

88. A computer program product for use in facilitating communication among a plurality of agents as set forth in claim 86, where in the means for selecting a message selects a message based on at least one element selected from a group consisting of a digital data packet, a signal strength, a time stamp, and a cumulative data portion of the digital packets.

89. A computer program product for use in facilitating communication among a plurality of agents as set forth in claim 88, configured for use with signals received of different types, whereby the means for selecting is operated independently for signals of each type.

90. A computer program product for use in facilitating communication among a plurality of agents as set forth in claim 88, wherein the means for receiving is configured to receive a cumulative strength measure in the cumulative data portion of a signal received, and wherein the means for modifying modifies the cumulative strength with a strength from the received signal.

91. A computer program product for use in facilitating communication among a plurality of agents as set forth in claim 90, wherein the means for selecting enables the data signal to be selected based on its associated strength signal and a direction from which it was received.

92. A computer program product for use in facilitating communication among a plurality of agents as set forth in claim 91, wherein the computer program product provides a means for selectively combining angular regions from which signals may be received to allow for different angular accuracy in the determination of the direction from which a digital signal is received.

93. A computer program product for use in facilitating communication among a plurality of agents as set forth in claim 92, further comprising means for generating a digital signal for transmission to at least one other locally spaced agent, the digital signal including a digital packet.

94. A computer program product for use in facilitating communication among a plurality of agents as set forth in claim 93, a means for detecting when the same signal just transmitted by the transmitter is received back in the receiver in order to detect reflection from objects near the agent, and a means for determining the approximate distance from an object based on the strength of the signal received.

95. A computer program product for use in facilitating communication among a plurality of agents as set forth in claim 93, further comprising means for determining a direction in which to transmit a signal and for controlling a transmitter to transmit a signal in the determined direction.

96. A computer program product for use in facilitating communication among a plurality of agents as set forth in claim 95, wherein the computer program product provides a means for selectively combining angular regions from which signals may be received to allow for different angular accuracy in the determination of the direction from which a digital signal is received.

97. A computer program product for use in facilitating communication among a plurality of agents as set forth in claim 93, wherein the means for generating a digital signal for transmission generates a data packet including the modified cumulative data portion of a signal selected by the means for selecting.

98. A computer program product for use in facilitating communication among a plurality of agents as set forth in claim 93, further comprising a means for controlling the transmitter to optionally vary the transmission strength.

99. A computer program product for use in facilitating communication among a plurality of agents as set forth in claim 98, wherein in the means for generating a digital signal for transmission generates a data packet including information regarding the transmission strength of the transmitted signals, and wherein the means for selecting step further includes the ability to use received information regarding the transmission strength to account for the altered strength of a signal when selecting from among signals.

* * * * *